United States Patent
Vassaux

(10) Patent No.: US 8,256,318 B2
(45) Date of Patent: Sep. 4, 2012

(54) SYSTEM FOR GEARING

(75) Inventor: Alain Vassaux, Puteaux (FR)

(73) Assignee: Hispano-Suiza, Colombes Cedex (FR)

( * ) Notice: Subject to any disclaimer, the term of this patent is extended or adjusted under 35 U.S.C. 154(b) by 230 days.

(21) Appl. No.: 12/235,999

(22) Filed: Sep. 23, 2008

(65) Prior Publication Data
US 2009/0078075 A1 Mar. 26, 2009

(30) Foreign Application Priority Data

Sep. 25, 2007 (FR) .................................. 07 57811

(51) Int. Cl.
*F16H 57/04* (2010.01)
(52) U.S. Cl. ........................................ 74/468; 184/6.12
(58) Field of Classification Search .................. 74/467, 74/468; 184/6.12, 6.26
See application file for complete search history.

(56) References Cited

U.S. PATENT DOCUMENTS

| | | | | |
|---|---|---|---|---|
| 1,502,083 A | * | 7/1924 | Zoelly | 74/464 |
| 3,364,776 A | | 1/1968 | Callahan | |
| 3,424,022 A | * | 1/1969 | Greenberg et al. | 74/409 |
| 3,495,471 A | * | 2/1970 | Johnson | 74/467 |
| 3,822,607 A | * | 7/1974 | Tharaldsen | 74/468 |
| 4,896,561 A | * | 1/1990 | Hayakawa et al. | 74/606 R |
| 5,033,585 A | * | 7/1991 | Mangas et al. | 184/7.4 |
| 5,119,905 A | * | 6/1992 | Murray | 184/6.11 |
| 5,505,102 A | * | 4/1996 | Craft | 74/467 |
| 5,622,239 A | * | 4/1997 | Orlitzky | 184/6.12 |
| 7,214,157 B2 | * | 5/2007 | Flamang et al. | 475/159 |
| 2002/0017133 A1 | * | 2/2002 | Cho | 73/504.02 |
| 2006/0053922 A1 | * | 3/2006 | Laabs | 74/467 |
| 2007/0175706 A1 | * | 8/2007 | Shilo et al. | 184/6.12 |

FOREIGN PATENT DOCUMENTS

| | | |
|---|---|---|
| GB | 1 209 792 | 10/1970 |
| JP | 409089083 A * | 3/1997 |
| JP | 2001-208173 | 8/2001 |

* cited by examiner

*Primary Examiner* — William C Joyce
(74) *Attorney, Agent, or Firm* — Oblon, Spivak, McClelland, Maier & Neustadt, L.L.P.

(57) ABSTRACT

A system for gearing, the system comprising a toothed wheel mounted on a shaft, the wheel being pierced by channels fed with lubricant, each channel opening out to the toothed periphery of the wheel. Said wheel is mounted on an end portion of the shaft, so as to be capable of being rotated by said shaft, said end portion being hollow so as to present an inside chamber, said chamber opening out to the end of the shaft via an orifice. Said channels communicate with said chamber. The system includes an injector for injecting lubricant into the chamber, the injector being situated outside the chamber and facing said orifice in such a manner as to inject the lubricant through said orifice, the lubricant penetrating into and flowing along the channels to the toothed periphery of the wheel under the effect of centrifugal force associated with rotation of the shaft.

11 Claims, 3 Drawing Sheets

SYSTEM FOR GEARING

FIELD OF THE INVENTION

The invention relates to a system for gearing, the system being of the type comprising a toothed wheel mounted on a shaft.

In the present application, the axial direction corresponds to the direction of the axis of rotation of the shaft, and a radial direction is a direction perpendicular to said axis.

BACKGROUND OF THE INVENTION

Lubricating gearing has always presented a problem, in particular when it is necessary to lubricate the meshing zone of a toothed wheel rotating at high speed.

A common solution consists in immersing the bottom portion of the wheel in a lubricant, generally oil. That solution is unsatisfactory since a large fraction of the lubricant used is ejected from the toothed periphery of the wheel under the effect of the centrifugal force associated with the wheel rotating, such that the quantity of lubricant in the meshing zone situated in the top portion of the wheel is small. In addition, it is necessary to have a large amount of lubricant so that the lubricant level is high and the bottom portion of the wheel is sufficiently immersed therein.

Another common solution consists in providing lubricant injectors, also referred to as nozzles, that are directed towards the meshing zone. That solution is also unsatisfactory since the jet of lubricant leaving the injectors generally ricochets off the teeth of the rotating wheel and only a small quantity of lubricant penetrates into the core of the meshing zone.

Another solution is described in document GB 1 355 156. That document proposes a system for gearing that comprises a toothed wheel mounted free on a shaft, the wheel being pierced by first channels that are fed with lubricant, the lubricant leaving those channels via orifices situated in the flanks of the teeth of the wheel. The first channels extend radially and have respective bends in the vicinity of their outlet orifices. The first channels are fed with lubricant via second channels that are connected to a pump. The second channels pass through the shaft axially and each of them has a bend prior to opening out into a groove formed in the periphery of the shaft.

A drawback of the system of GB 1 355 156 stems from the fact that the first and second channels are complex in shape and therefore difficult and expensive to make. In addition, the second channels need to pass axially along the shaft of the wheel. If the length of the shaft is considerable, the second channels are even more difficult and expensive to make. Furthermore, when making the first channels, there is a risk of damaging the flanks of the teeth. These flanks form part of the meshing interface or active profile of the set of teeth and their shape must be preserved. Finally, it is necessary for the wheels to turn relative to the shaft in order to ensure that all of the first channels are fed with lubricant.

Another solution is described in document U.S. Pat. No. 3,364,776. That document proposes a system for gearing comprising a toothed wheel mounted on a shaft, the wheel being pierced by channels fed with lubricant, the lubricant leaving the channels via outlet orifices present in the toothed periphery of the wheel. The inlet orifices of the channels are situated in the side face of the wheel. To feed the channels with lubricant, either the bottom portion of the wheel is immersed in a bath of lubricant (see FIG. 4 of U.S. Past. No. 3,364,776), thereby requiring a large amount of lubricant, or else a bowl-shaped cover is provided that is mounted on the side face of the wheel (see FIGS. 6 and 7 of U.S. Pat. No. 3,364,776). Fabricating and assembling the cover increases the number of parts in the system and its fabrication cost.

OBJECT AND SUMMARY OF THE INVENTION

The invention seeks to propose an alternative solution to known systems that enables some of their drawbacks to be avoided.

This object is achieved by a system for gearing, the system comprising a toothed wheel mounted on a shaft, the wheel being pierced by channels fed with lubricant, each channel opening out to the toothed periphery of the wheel, wherein said wheel is mounted on an end portion of the shaft, so as to be capable of being rotated by said shaft, said end portion being hollow so as to present an inside chamber, said chamber opening out to the end of the shaft via an orifice, and wherein said channels communicate with said chamber, the system further including an injector for injecting lubricant into the chamber, the injector being situated outside the chamber and facing said orifice in such a manner as to inject the lubricant through said orifice, the lubricant penetrating into and flowing along the channels to the toothed periphery of the wheel under the effect of centrifugal force associated with rotation of the shaft.

The chamber is easy to make providing it is designed to be simple in shape. For example, the chamber may be in the form of a circular cylinder. Similarly, the channels can be made easily providing they are designed to be simple in shape. For example, the channels are designed to be rectilinear.

In this system, when the shaft is rotating, the lubricant that is injected into the chamber is projected under the effect of centrifugal force against the side wall of the chamber and forms a ring of lubricant on said wall, i.e. it forms a thickness (or layer) of lubricant that matches the annular shape of the chamber and that feeds the channels.

In this system, the wheel therefore is not immersed in a bath of lubricant, so the quantity of lubricant used can be relatively small.

It should also be observed that the shaft and the wheel are constrained to rotate together and that the lubrication technique proposed is entirely compatible with the shaft rotating, in particular because no coupling is needed between the shaft and the source of lubricant, i.e. the injector. In other words, the injector can be separate from the shaft. The injector is preferably separate from the shaft, thereby simplifying fabrication of the system.

In an embodiment, the orifice of the chamber is centered on the axis of rotation of the shaft so that its position does not change while the shaft is rotating, thereby making it easier to inject lubricant through the orifice.

In an embodiment, the chamber is defined by a rim surrounding said orifice, the rim serving to retain lubricant fluid in the chamber. More precisely, when the shaft is in rotation, the rim serves to retain the ring of lubricant, and when the shaft is at rest, the rim serves to retain a residue of lubricant in the bottom portion of the chamber.

In an embodiment, each channel opens out between two successive teeth of the wheel. This enables the integrity of the flanks of the teeth to be conserved (given that these flanks constitute the meshing interface or active profile of the set of teeth). In addition, the teeth are not weakened, since the channels do not pass through them.

In an embodiment, the wheel presents at least one circular groove in its toothed periphery, with the channels opening out into the groove, the axial width of said groove being greater than the axial width of the channels. This enables the channels to be formed without being hindered and without it being necessary to re-machine the profiles of the teeth after making the channels.

In an embodiment, for reasons of industrial feasibility, the channels present a fluid flow section that is relatively large, and nozzles are mounted in the channels at the toothed periphery of the wheel, these nozzles presenting a fluid flow section that is smaller than that of the channels. The nozzles serve to limit the flow rate of the fluid since otherwise it would be greater than necessary.

The invention also provides gearing including a system for gearing of the above-specified type together with at least one other toothed element meshing with the wheel of said system for gearing. The other toothed element may be another toothed wheel, a rack, a ring, etc.

BRIEF DESCRIPTION OF THE DRAWINGS

The invention and its advantages can be better understood on reading the following detailed description of an embodiment of the invention. The description refers to the accompanying figures, in which.

MORE DETAILED DESCRIPTION

Figure 1:
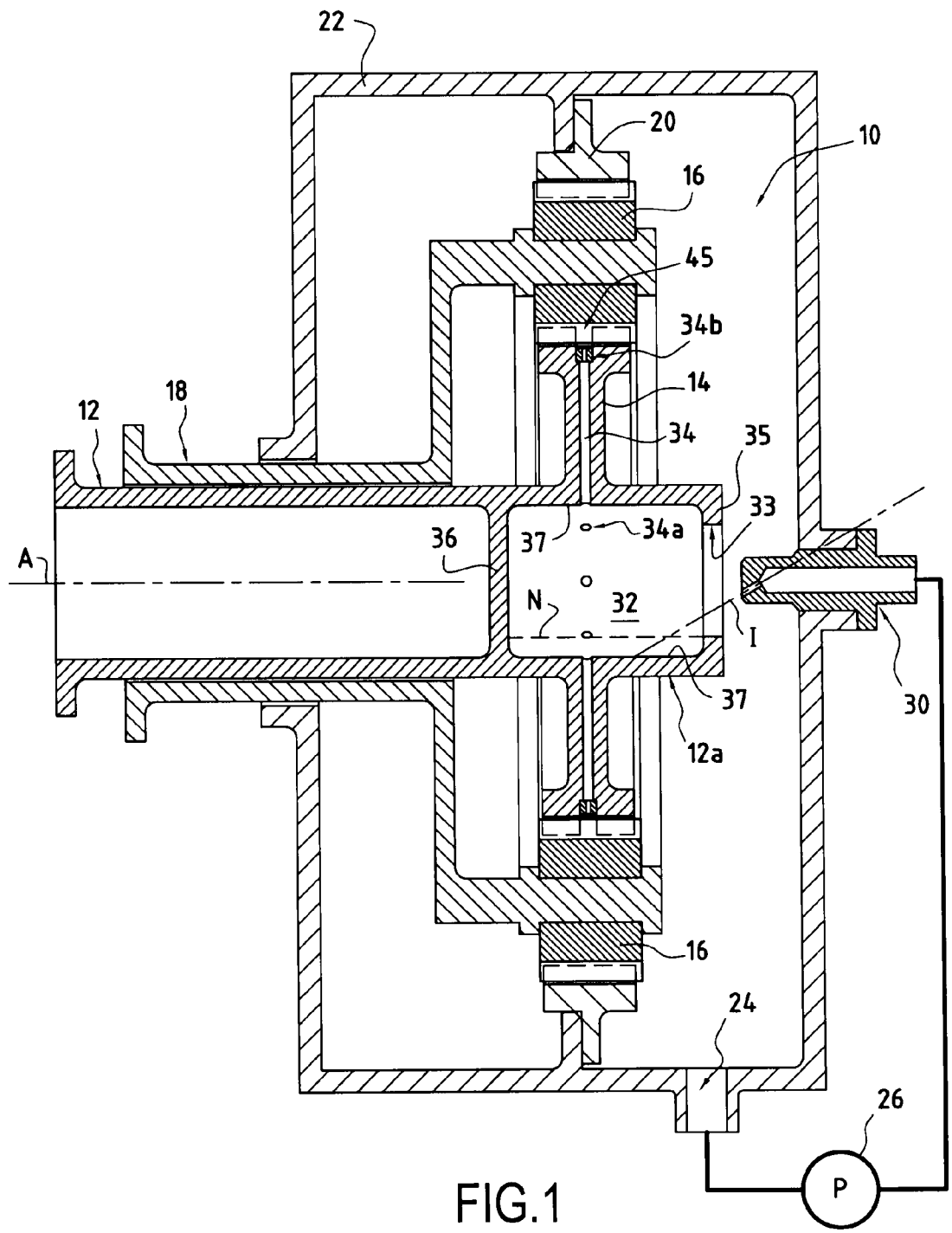
FIG. 1 is an axial section along half-planes P of FIG. 2 of an example of gearing including a system of the invention with a central toothed wheel.

FIG. 1 shows an example of gearing. More precisely, it shows an epicyclic gear train 10.

This gear train 10 can be used as a reduction gear in the automobile, rail, shipping, or aviation fields. More particularly, it can be used within a terrestrial or aviation turbomachine, and specifically within a turboprop or a turbojet for an airplane. For example, it can be used as a reduction gear in a mechanical power transmission, such as a propeller reduction gear or a fan reduction gear.

The gear train 10 comprises:

A central toothed wheel mounted on a shaft 12 and constrained to rotate therewith. The shaft 12 rotates about the axis A. This toothed wheel is called the sun wheel 14, or inner gear. In this example, the sun wheel 14 and the shaft 12 comprise a single part.

Three toothed wheels surrounding the sun wheel 14 and meshing therewith. These toothed wheels are referred to as planets 16. The three planets 16 are mounted on a planet-carrier shaft 18 coaxially surrounding the shaft 12.

A ring 20 having inwardly-directed teeth, surrounding the planets 16, and meshing with them. This ring 20 is also referred to as the outer gear.

A casing 22 surrounds the sun wheel 14, the planets 16, and the ring 20, and the shafts 12 and 18 pass therethrough. The casing 22 serves to support and protect the gear train 10. In addition, the casing 22 is substantially leaktight and enables the lubricant that is used for lubricating the gear train 10 to be recovered. The casing 22 presents in its bottom wall an outlet orifice 24 through which the lubricant can be removed. To remove the lubricant, use is made of a pump 26 that is connected to the outlet orifice 24.

The ring 20 is secured to the casing 22 and these two elements are stationary (i.e. they do not rotate). The shafts 12 and 18 are rotatable about the axis A.

On rotating, the shaft 12 forces the planets 16 to run inside the ring 20. As they move, the planets 16 drive the planet carrier 18.

Since the general structure and the general operation of an epicyclic gear train are known, they are not described in greater detail. The term "epicyclic" comes from the epicycloid path followed by a point on a planet 16 as observed relative to the sun wheel 14.

The device shown in FIG. 1 includes an example of a system for gearing of the invention. This system for gearing comprises the sun wheel 14, the shaft 12, and a lubricant injector 30.

In accordance with the invention, the sun wheel 14 is mounted on an end portion 12a of the shaft 12, this end portion 12a being hollow so as to present internally a chamber 32. This chamber 32 opens out to the end of the shaft via an orifice 33. The orifice 33 is situated in the end face of the shaft 12. In this example, the shaft 12 and the chamber 32 are circularly cylindrical in shape about the axis A, and the orifice 33 has a circular outline centered on the axis A.

The chamber 32 is defined at one end (on the right in FIG. 1) by an annular rim 35 surrounding the orifice 33, and at its opposite end (on the left in FIG. 1) by a solid radial wall 36 forming a partition subdividing the inside of the shaft 12. The side wall 37 of the chamber 32 corresponds to the side wall of the end portion 12a of the shaft.

The sun wheel 14 is pierced by channels 34. These channels 34 are fed with lubricant, typically with oil.

Each channel 34 extends from the chamber 32 to the tooted periphery of the sun wheel 14. In the example, each channel 34 is rectilinear and extends radially. Each channel 34 communicates with the chamber via an inlet orifice 34a and with the outside via an outlet orifice 34b. The inlet orifices 34a of the channels are situated in the side wall 37 of the chamber 32.

The lubricant injector 30 is not connected to the sun wheel 14 or the shaft 12. It lies outside the chamber 32 and is mounted through a wall of the casing 22, so as to face the orifice 33 of the chamber 32. The lubricant injector 30 is thus stationary.

The lubricant injector 30 serves to inject lubricant into the chamber 32 through the orifice 33. Thus, the injection axis I of the injector 30 passes through the orifice 33. In the example, the injection axis I is inclined relative to the axis A, going towards the side wall 37 of the chamber 32 in such a manner that the lubricant comes directly into contact with the side wall 37.

By way of example, the injector 30 is fed with lubricant by the pump 26. Under such circumstances, the lubricant circuit between the injector 30, the chamber of the casing 22, and the pump 26 is a closed circuit.

When the shaft is at rest, the rim 35 serves to retain a residue of lubricant fluid in the bottom portion of the chamber 32. The top surface N of this residue of lubricant fluid is shown in dashed lines in FIG. 1.

When the shaft 12 is in rotation, the lubricant is projected by centrifugal force against the side wall 37 and forms a ring of lubricant on said wall that feeds the channels 34 via the inlet orifices 34a. The rim 35 serves to retain the ring of lubricant in the chamber 32. The lubricant penetrates into and flows along the channels 34 and leaves them via the outlet orifices 34b under the effect of the centrifugal force associated with the shaft 12 rotating. Thereafter, the lubricant spreads over the toothed periphery of the sun wheel 14 and lubricates the outside of this wheel together with all of the meshing interfaces between the sun wheel 14 and the planets 16. The planets 16 rotate both about their own axes and about the sun wheel 14, causing the lubricant to pass from the planets 16 to the gear ring 20, thereby also lubricating the gear ring.

The lubricant can also be used for cooling the gear train 10, providing the temperature of the lubricant is lower than the temperature of the gear train. Under such circumstances, the fluid flow section in the channels 34 and the number of channels 34 are also determined as a function of the amount of heat that is to be dissipated.

The channels 34 are generally of circular section with a diameter D that is much shorter than their length. For example they are formed by electro-erosion machining.

Figure 4:
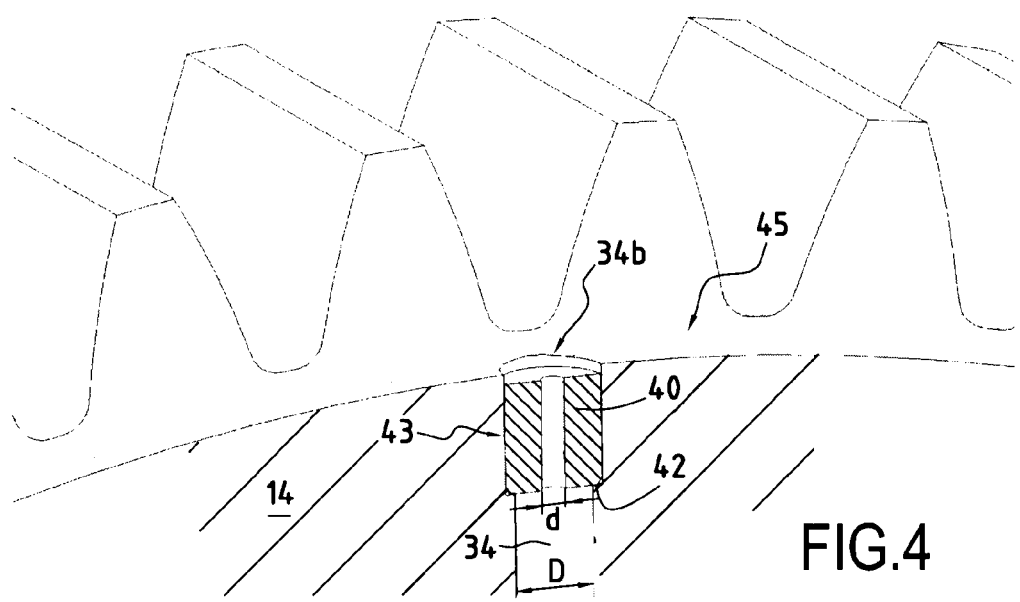
FIG. 4 is a detail view in perspective of the toothed periphery of the sun wheel of FIG. 1.

For questions of industrial feasibility, the channels 34 may be drilled to have a diameter D that is relatively large and may be provided with respective nozzles 40 at their ends adjacent to the toothed periphery of the sun wheel 14, which nozzles can also be called restrictors (see FIG. 4). Each nozzle 40 has a fluid flow section that is smaller than that of the channels 34 (i.e. a circular section of diameter d less than D) so as to restrict the rate at which lubricant leaves the channel 34.

The nozzle 40 may be mounted as a tight fit, or it may be crimped, or it may be screwed and locked in the outlet orifice 34b of the channel 34. In the example of FIG. 4, in order to make it easier to put the nozzle 40 into place, the channel 34 is enlarged so as to create a housing 43 therein with a shoulder 42 against which the nozzle 40 rests. The nozzles 40 are preferably made of a material that is identical to that of the wheel, or of a material presenting a coefficient of expansion that is similar, in order to avoid differential expansion at the various operating temperatures of the gear train 10.

Figure 2:
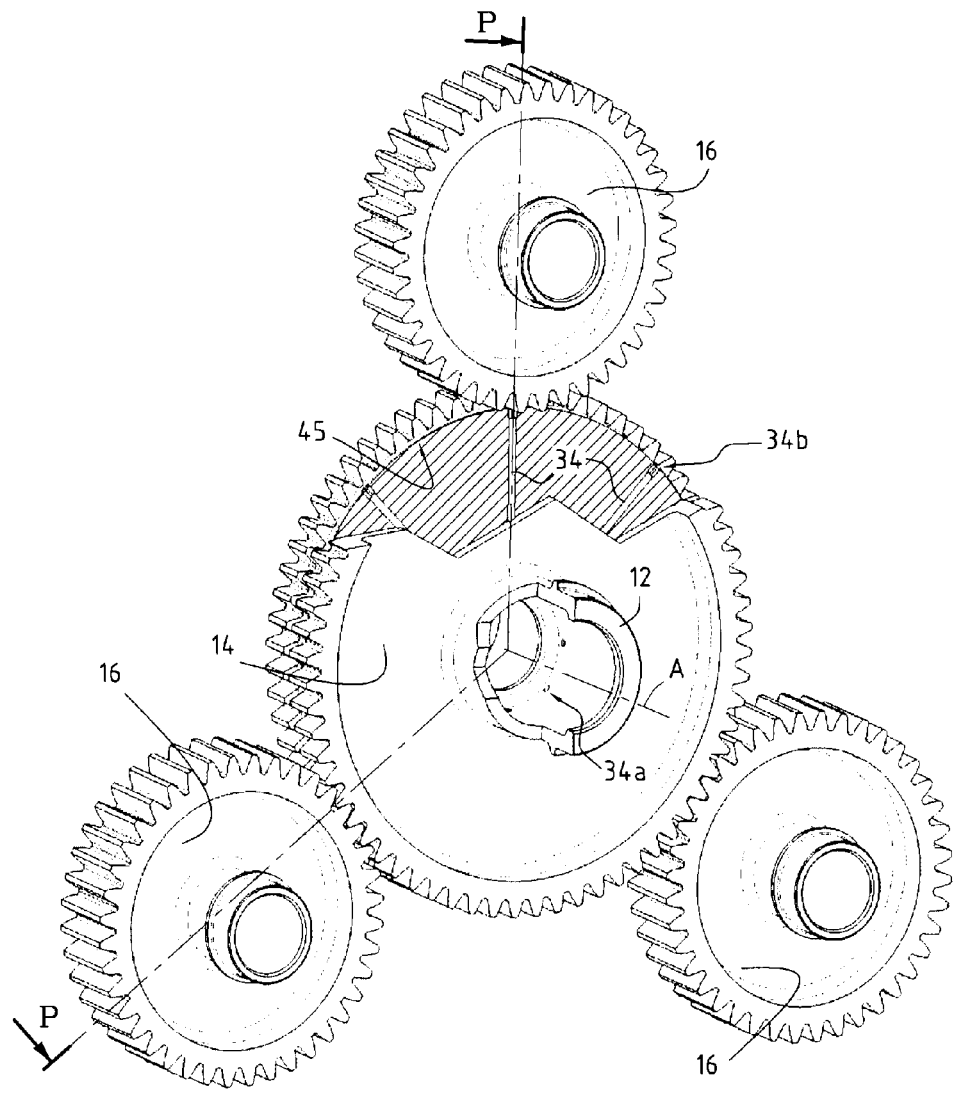
FIG. 2 is a perspective view showing part of the FIG. 1 gearing.
Figure 3:
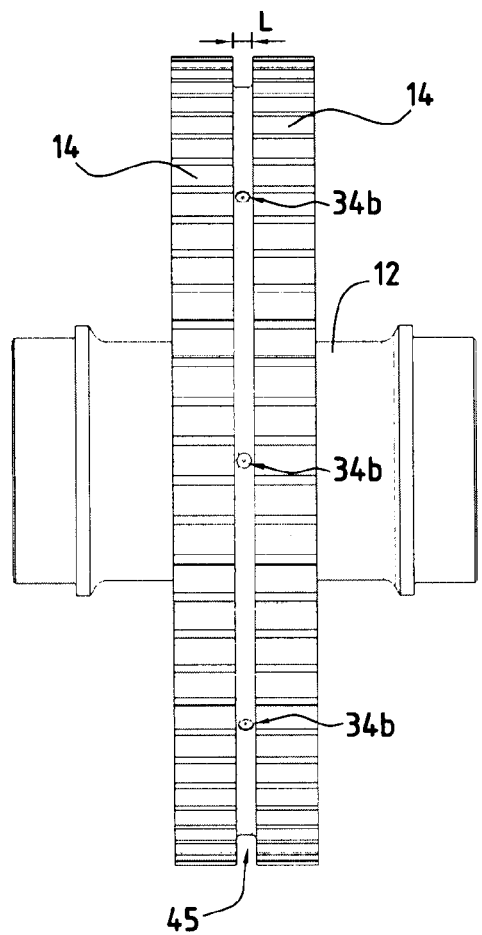
FIG. 3 is a side view looking of the central toothed wheel in FIG. 1.

As shown in FIGS. 2 and 3, the sun wheel 14 presents a circular groove 45 in its toothed periphery with the channels 34 opening out into said groove, the axial width L of the groove 45 being greater than the width of the channels 34. This makes it easier to machine the channels 34 and the housing 43, and also makes it easier to put the nozzles 40 into place, and in particular this makes it possible to avoid touching the active profiles of the teeth while machining the sun wheel 14.

What is claimed is:

1. A system for gearing, the system comprising a toothed wheel mounted on a shaft, the wheel being pierced by channels fed with lubricant, each channel opening out to the toothed periphery of the wheel,
   wherein said wheel is mounted on an end portion of the shaft, so as to be capable of being rotated by said shaft,
   wherein said end portion is hollow so as to present an inside chamber, said chamber opening out to the outside of the shaft, via an orifice situated at an end of the shaft, and
   wherein said channels communicate with said chamber,
   the system including an injector for injecting lubricant into the chamber, the injector being situated outside the chamber, not being in contact with the shaft, and facing said orifice in such a manner as to inject the lubricant through said orifice, the lubricant penetrating into and flowing along the channels to the toothed periphery of the wheel under the effect of centrifugal force associated with rotation of the shaft,
   wherein the end portion of the shaft is provided with a rim which extends radially relative to an axis of rotation of the shaft and surrounds said orifice, the chamber being defined by the rim which serves to retain lubricant fluid in the chamber, and
   wherein the shaft is adapted to rotate around an axis of rotation, wherein each channel communicates with the chamber via an inlet orifice situated in a side wall of the chamber, and wherein said injector has an injection axis passing through the orifice and being inclined relative to the axis of rotation of the shaft towards said side wall in such a manner that the lubricant comes directly into contact with the side wall.

2. A system for gearing according to claim 1, wherein the shaft is adapted to rotate around an axis of rotation, said orifice being centered on the axis of rotation.

3. A system for gearing according to claim 1, wherein each channel opens out between two successive teeth of the wheel.

4. A system for gearing according to claim 1, wherein the wheel presents at least one circular groove in its toothed periphery, with the channels opening out into the groove, the channels and the groove having axial widths such that the axial width of said groove is greater than the axial width of the channels.

5. A system for gearing according to claim 1, wherein nozzles are mounted in the channels at the toothed periphery of the wheel, these nozzles presenting a fluid flow section that is smaller than that of the channels.

6. A system for gearing according to claim 1, wherein the channels are rectilinear.

7. A system for gearing according to claim 1, wherein the channels extend radially relative to the axis of rotation of the shaft.

8. Gearing including the system of claim 1 and at least one other toothed element meshing with the wheel of the system.

9. A turbomachine including the gearing of claim 8.

10. A system for gearing according to claim 1, wherein the shaft has an end face, said orifice being situation in the end face of the shaft.

11. A system for gearing according to claim 1 further comprising a casing which surrounds the wheel and the end of the shaft, the shaft passing through a first wall of the casing, wherein the injector is mounted through a second wall of the casing.

* * * * *